Patented Aug. 4, 1936

2,050,190

UNITED STATES PATENT OFFICE 2,050,190

VULCANIZATION OF RUBBER

Joy G. Lichty, Stow, Ohio, assignor to Wingfoot Corporation, Wilmington, Del., a corporation of Delaware No Drawing. Application May 15, 1935, Serial No. 21,685

19 Claims. (Cl. 18—53)

This invention relates to a class of novel compounds, the members of which are useful as accelerators of the vulcanization of rubber. It includes the compounds themselves, the method of vulcanizing rubber in their presence and the rubber products so prepared. More particularly, the novel compounds of the invention are reaction products of mono-halogenated dialkyl ketones and salts of dithiocarbamic acids.

Dithiocarbamates have long been used as accelerators in the vulcanization of rubber. Among the commercially important materials are zinc dimethyl dithiocarbamate and dimethyl ammonium dimethyl dithiocarbamate. It has also been known, as disclosed in U. S. Patent No. 1,869,862, that the reaction products of dithiocarbamic acid salts and asymmetrical dichlor acetone are valuable as accelerators. These latter compounds are much faster curing than the compounds of the present invention and sometimes cause difficulties in the processing of the rubber stocks in which they are employed because of their powerful action. In fact, one of the principal difficulties with the dithiocarbamate class of accelerators is their powerful curing activity which makes their use practically impossible in certain types of rubber stocks.

One of the objects of the invention is, accordingly, the provision of a new class of dithiocarbamates which are non-scorching accelerators. Another object is to provide an improved process of vulcanizing rubber. Other objects and advantages will become apparent as the description of the invention proceeds.

Illustrative of the compounds to which the invention relates is the type formula

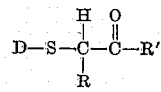

wherein R is hydrogen or an alkyl radical, R' is an alkyl radical and D is a thio carbamyl group. A preferred formula further illustrating the compounds of the invention is the following:

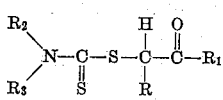

wherein R is hydrogen or an alkyl radical, $R_1$ is an alkyl radical and $R_2$ and $R_3$ are aliphatic or aliphatic-like radicals which may, if desired, be joined together to form a cyclic chain.

In the formula

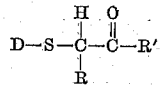

R represents hydrogen or an alkyl radical. Thus, where the ketone employed is mono chlor acetone or mono chloro methyl ethyl ketone, R is hydrogen; similarly where a ketone such as methyl alpha chloro ethyl ketone is employed, R is $-CH_3$. The halogenated dialkyl ketones employed in the practice of the invention may be conveniently prepared by halogenating a dialkyl ketone. In such compounds the halogen atom generally attaches to the carbon atom of one of the alkyl groups alpha to the carbonyl group. Also, such compounds form dithiocarbamate derivatives which are preferable for use in the vulcanization of rubber.

In general, the compounds of the invention may be prepared by simply bringing together in a suitable medium a mono halogenated dialkyl ketone and a salt of a dithiocarbamic acid. In certain cases, a compound forms at once; in others, it may be necessary to allow the mixture to stand for a few hours or to heat the mixture somewhat. In any case, the product forms as a solid or oil which may be easily separated and purified. Usually the medium employed will be water but other liquids, preferably solvents for one or both of the reactants, such as alcohol, acetone, and benzene, may be employed.

Illustrating the preparation of these compounds is that of acetonyl dimethyl dithiocarbamate. This compound is prepared by adding slowly, with stirring, 37 grams of mono chloro acetone to an aqueous acetone solution of 0.44 mol. of sodium dimethyl dithiocarbamate. During the addition of the chloro acetone the temperature rises to 60° C. an oil separates out at once. The mass is then heated to 75° C. in a beaker in order to remove the acetone. The oily layer solidifies on cooling and is then filtered off and dried. The product, acetonyl dimethyl dithiocarbamate, is obtained in a yield of 65.5 grams and when recrystallized from acetone gives colorless needles melting at 56° C. The reaction is believed to proceed as follows:

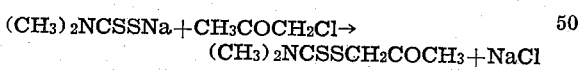

An analysis of the product gave an average nitrogen content of 7.87% and an average sulphur content of 36.35% as compared with the theoretical nitrogen and sulphur contents of 7.78% and 36.25%, respectively.

The reaction product of methyl alpha chloro ethyl ketone and sodium dimethyl dithiocarbamate may be prepared similarly by adding 32 grams of methyl alpha chloro ethyl ketone to an aqueous acetone solution of 47.2 grams of sodium dimethyl dithiocarbamate. The product soon separates out as a liquid layer, the mixture being stirred occasionally during a period of approximately 30 minutes. Water is added and the resulting oil separated by means of a separatory funnel. After being washed and dried, the product is obtained as a red liquid and in an amount of 46.2 grams. The equation representing the reaction is believed to be as follows:

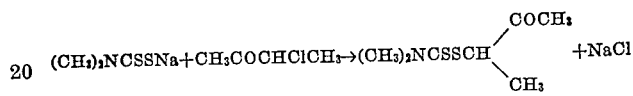

Further illustrating the invention, the reaction product of alpha chloro methyl ethyl ketone and sodium dimethyl dithiocarbamate is prepared by reacting 32 grams of alpha chloro methyl ethyl ketone and 47.2 grams of sodium dimethyl dithiocarbamate in the manner previously described. The product after being purified in the same manner as the preceding examples is obtained in the form of a liquid in an amount of 53.5 grams. After one day's standing, however, the product solidifies. When recrystallized from methyl alcohol, the colorless solid melts at 46–47° C. An analysis of this compound gives an average nitrogen content of 7.48% and an average sulphur content of 33.91% as compared to the theoretical nitrogen and sulphur contents for propionyl methyl dimethyl dithiocarbamate of 7.33% and 33.53%, respectively. The equation representing the reaction is as follows:

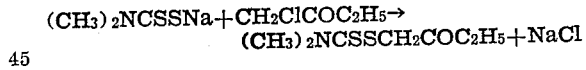

Other compounds falling within the scope of the invention are acetonyl penta methylene dithiocarbamate, acetonyl dicyclohexyl dithiocarbamate, acetonyl diethyl dithiocarbamate, acetonyl oxy tetra methylene dithiocarbamate, acetonyl di tetrahydro alpha furfuryl dithiocarbamate, acetonyl tetrahydro alpha furfuryl dithiocarbamate, acetonyl butyl dithiocarbamate, acetonyl benzyl dithiocarbamate, acetonyl ethyl cyclohexyl dithiocarbamate, acetonyl phenyl cyclohexyl dithiocarbamate, acetonyl cyclohexyl dithiocarbamate, acetonyl di iso amyl dithiocarbamate, acetonyl dibenzyl dithiocarbamate, and the corresponding dithiocarbamate derivatives of methyl alpha chloro ethyl ketone, alpha chloro methyl ethyl ketone, and alpha chloro methyl isobutyl ketone.

Generally N—N-disubstituted dithiocarbamates are more preferable than the mono N-substituted dithiocarbamates, such as the N-butyl dithiocarbamates, although the latter are included in the invention. Also, while chloro dialkyl ketones have been described in the examples, it will be understood that other mono-halogenated ketones, such as the brom dialkyl ketones may be employed.

The compounds to which the invention relates may be employed as accelerators of vulcanization in substantially any of the rubber formulae, preferably, however, in those in which a basic nitrogen-containing accelerator is also present. One found particularly satisfactory is the following:

|  | Parts by weight |
|---|---|
| Extracted pale crepe rubber | 100 |
| Zinc oxide | 5 |
| Sulphur | 3 |
| Stearic acid | 1.5 |
| Diphenylguanidine | 0.2 |
| Accelerator | 0.5 |

Results obtained by use of compounds of this formula are summarized in the following tables:

| Cure in mins. °F. | Ult. tens. kgs/cm² | Max. elong. in per cent | Modulus in kgs/cm² 500% | 700% |
|---|---|---|---|---|
| *Acetonyl dimethyl dithiocarbamate* | | | | |
| 30/260 | 67 | 890 | 9 | 23 |
| 40 | 90 | 850 | 13 | 40 |
| 60 | 114 | 835 | 17 | 53 |
| 80 | 117 | 830 | 19 | 57 |
| 60/285 | 115 | 810 | 20 | 62 |
| *The reaction product of methyl alpha chloro ethyl ketone and sodium dimethyl dithiocarbamate* | | | | |
| 40/285 | 57 | 860 | 9 | 24 |
| 60 | 78 | 850 | 12 | 32 |
| 80 | 89 | 860 | 14 | 35 |
| 120 | 111 | 840 | 7 | 48 |
| *Propionyl methyl dimethyl dithiocarbamate* | | | | |
| 20/260 | 39 | 900 | 8 | 16 |
| 40 | 85 | 920 | 15 | 46 |
| 60 | 118 | 800 | 19 | 65 |
| 80 | 126 | 820 | 19 | 64 |

The novel compounds to which the invention relates thus possess valuable properties as accelerators of vulcanization. They are non-scorching and are particularly valuable when employed in conjunction with activators of the nature of basic nitrogen-containing accelerators, such as diphenylguanidine, diortho tolyl guanidine, diphenylguanidine acid oxalate, diortho tolyl guanidine neutral succinate, 2-4-diamino diphenyl amine, 4-4' diamino diphenyl methane, dibutyl ethylene diamine and the high boiling ethylene poly amines such as those boiling between the range of 160° C. at normal pressure and 270° C. at 25 mm. The compounds of the invention may be employed by themselves but preferably in conjunction with activators of the nature of those mentioned.

It is intended that the patent shall cover, by suitable expression in the appended claims, whatever features of patentable novelty reside in the invention.

What I claim:

1. The process of treating rubber which comprises vulcanizing rubber in the presence of acetonyl N-N-dimethyl dithiocarbamate.

2. The process of treating rubber which comprises vulcanizing rubber in the presence of an acetonyl N-N-dialkyl dithiocarbamate.

3. The process of treating rubber which comprises vulcanizing rubber in the presence of a basic nitrogen-containing accelerator and an acetonyl ester of a dithiocarbamic acid.

4. The process of treating rubber which comprises vulcanizing rubber in the presence of a diaryl guanidine and an acetonyl dialkyl dithiocarbamate.

5. The process of treating rubber which comprises vulcanizing rubber in the presence of a basic nitrogen-containing accelerator and a compound having the formula

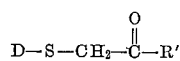

wherein D is a thio carbamyl group and R' is an alkyl group.

6. The process of treating rubber which comprises vulcanizing rubber in the presence of a basic nitrogen-containing accelerator and a compound having the formula

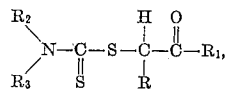

wherein R is hydrogen or alkyl, $R_1$ is alkyl and $R_2$ and $R_3$ are aliphatic radicals.

7. Acetonyl N-N-dimethyl dithiocarbamate.

8. An acetonyl N-N-dialkyl dithiocarbamate.

9. An acetonyl ester of a dithiocarbamic acid.

10. The compounds having the formula

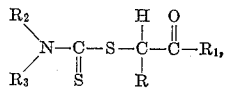

wherein R is hydrogen or alkyl, $R_1$ is alkyl and $R_2$ and $R_3$ are aliphatic radicals.

11. The compounds having the formula

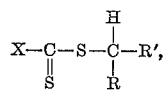

wherein X is a tertiary amino radical, R is hydrogen or alkyl and R' is an aliphatic acyl radical.

12. The process of accelerating the vulcanization of rubber which comprises vulcanizing in the presence of a basic nitrogen-containing accelerator and a dialkyl ketone in which one hydrogen atom attached to a carbon atom alpha to the carbonyl group is replaced by the group —S—D, wherein D is a thio carbamyl radical.

13. The process of accelerating the vulcanization of rubber which comprises vulcanizing in the presence of a basic nitrogen-containing accelerator and a dialkyl ketone in which one hydrogen atom attached to a carbon atom alpha to the carbonyl group is replaced by the group —S—D, wherein D is a disubstituted amino thio carbonyl radical.

14. A rubber product which has been vulcanized in the presence of a basic nitrogen-containing accelerator and a dialkyl ketone in which one hydrogen atom attached to a carbon atom alpha to the carbonyl group is replaced by the group —S—D, wherein D is a thio carbamyl radical.

15. Dialkyl ketones in which one hydrogen atom attached to a carbon atom alpha to the carbonyl group is replaced by the group —S—D, wherein D is a thio carbamyl radical.

16. Dialkyl ketones in which one hydrogen atom attached to a carbon atom alpha to the carbonyl group is replaced by the group —S—D, wherein D is a disubstituted amino thio carbonyl radical.

17. Alkyl methyl ketones in which one hydrogen atom of the methyl group is replaced by the group —S—D, wherein D is an aliphatic thio carbamyl radical.

18. A rubber vulcanization accelerating material comprising a dialkyl ketone in which one hydrogen atom attached to a carbon atom alpha to the carbonyl group is replaced by the group S—D, wherein D is a thio carbamyl radical.

19. A rubber vulcanization accelerating material comprising a dialkyl ketone in which one hydrogen atom attached to a carbon atom alpha to the carbonyl group is replaced by the group S—D, wherein D is a disubstituted amino thio carbonyl radical.

JOY G. LICHTY.